Patented Oct. 20, 1953

2,656,337

UNITED STATES PATENT OFFICE 2,656,337

COPOLYMERS OF ACRYLONITRILE AND ALLYL AND 2-METHALLYL CHLORIDES

John R. Caldwell, Kingsport, Tenn., assignor to Eastman Kodak Company, Rochester, N. Y., a corporation of New Jersey No Drawing. Application December 28, 1949, Serial No. 135,531

12 Claims. (Cl. 260—85.5)

1

This invention relates to copolymers of acrylonitrile with allyl chloride and with 2-methallyl chloride, in which the major portion by weight of the copolymer is acrylonitrile.

It is known that acrylonitrile is homopolymerizable to a high molecular weight resinous compound which is insoluble in most of the common organic solvents. This fact, together with its known excessive hardness, brittleness and very high softening point, has been a decided disadvantage in employing polyacrylonitrile in extrusion processes wherein the resin molecules are oriented so as to be parallel with the major surface, as in the production of filaments, fibers, etc. The filaments produced from polyacrylonitrile are porous, spongy, weak or brittle or have a discontinuous structure. Allyl and 2-methallyl chlorides, on the other hand, are not homopolymerizable to high molecular weight polymers. D. E. Adelson et al., United States Patent 2,331,869, dated October 12, 1943, showed that allyl chloride and 2-methallyl chloride, when homopolymerized in the presence of boron trifluoride, resulted in relatively low molecular viscous polymers. More recently, W. Bauer et al., United States Patent 2,338,893, dated January 11, 1944, showed that prolonged heating at refluxing temperatures of allyl chloride or of 2-methallyl chloride, in the presence of benzoyl peroxide, gave similar low molecular weight, viscous polymers. Obviously, such viscous polymers are unsuitable for the production of tough and flexible filaments and sheet materials.

I have now found that acrylonitrile and allyl chloride or acrylonitrile and 2-methallyl chloride can be copolymerized in certain proportions to give high molecular weight copolymers, which are soluble in one or more solvents such as gamma-butyrolactone, gamma-valerolactone, ethylene carbonate, N-methyl pyrrolidine, dimethyl acetamide, dimethyl formamide or in mixtures of these solvents, the copolymers containing 75% or less of acrylonitrile being also soluble in acetonitrile, for example, in a mixture of 2 parts of acetonitrile and 1 part of dimethyl formamide, and give from such solutions by either the dry or wet spinning methods high quality filaments, and by coating valuable sheet materials. The copolymers can also be molded into shaped objects.

It is accordingly, an object of my invention to provide new copolymers. A further object is to provide a new copolymer from which high quality yarns can be made. A further object is to provide a new copolymer from which high

2 quality sheet materials and molded objects can be made. A further object is to provide a process for preparing such copolymers. Other objects will become apparent hereinafter.

In accordance with my invention, I prepare the new copolymers by polymerizing a mixture of monomeric acrylonitrile and monomeric allyl chloride or a mixture of monomeric acrylonitrile and monomeric 2-methallyl chloride. The polymerization is advantageously carried out in the presence of a polymerization catalyst, e. g. a peroxide polymerization catalyst. Peroxide polymerization catalysts which are soluble in the mixtures of monomers can be employed, e. g. organic peroxides such as benzoyl peroxide, acetyl peroxide, lauroyl peroxide, tertiary butyl hydroperoxide, etc. Water soluble peroxides can also be used, e. g. hydrogen peroxide, ammonium persulfate, potassium persulfate, sodium persulfate, persulfuric acid, the water-soluble salts of percarbonic acid, the water-soluble salts of perphosphoric acid, the water-soluble salts of sulfoper-acid (Caro's acid). As water-soluble salts, the ammonium, potassium and sodium salts are especially suitable. Mixtures of the catalysts can be employed.

The polymerizations can be carried out in bulk (mass), in solvents or in heterogenous dispersion where the mixture of monomers is dispersed in a non-solvent for the monomers, the particles of dispersed monomers being very small (emulsion) or relatively large (bead or granular). In bulk or mass polymerization, the organic peroxide catalysts are advantageously employed. In solvent polymerization, the organic peroxide catalysts are also advantageously employed. Suitable solvents include acetone, methyl ethyl ketone, methyl alcohol, ethyl alcohol, n-propyl alcohol, isopropyl alcohol, tertiary butyl alcohol, 1,4-dioxane, chloroform, carbon tetrachloride naphtha (liquid saturated aliphatic hydrocarbons boiling from 60 to 100° C.), benzene, etc. Mixtures of solvents can be employed.

For emulsion polymerization, any non-solvent for the mixtures of monomers can be employed, water being especially advantageous. The mixture of monomers can be advantageously emulsified in the water using emulsifying agents such as salts of higher fatty acids, e. g. sodium or potassium stearate, palmitate, etc. or ordinary soaps, salts of higher fatty alcohol sulfates, e. g. sodium or potassium lauryl sulfate, sodium or potassium di (2-ethylhexyl) sulphosuccinate, sodium or potassium dihexyl sulphosuccinate, sodium or potassium cetyl sulfate, sodium or potassium stearyl sulfate, etc., salts of aromatic sulfonic acids, e. g. sodium or potassium salts of alkylnaphthalene sulfonic acids, etc., higher molecular weight quaternary ammonium salts, e. g. dimethyl benzylphenyl ammonium chloride, quaternary ammonium salts containing the radicals $C_{15}H_{31}$ and $C_{17}H_{35}$, etc. Mixtures of emulsifying agents can be employed.

For bead or granular polymerization relatively poor dispersing agents such as starch, methylated starch, gum arabic, polyvinyl alcohol, partly hydrolyzed polyvinyl acetate, gelatin, sodium cellulose glycolate, etc. can be employed. Mixtures of dispersing agents can be employed.

In the polymerizations wherein the mixture of monomers is dispersed in a non-solvent, the dispersion of the mixture of monomers can be facilitated by stirring, shaking or tumbling the mixtures of monomers and non-solvent. In emulsion polymerization, the water-soluble polymerization catalysts are advantageously employed. Heat accelerates all the polymerizations, a temperature range of 40 to 60° C., for a period of from 24 to 48 hours being advantageous.

The copolymers of the invention advantageously contain not less than 2% and not more than 40% by weight of allyl chloride or of 2-methallyl chloride units, the remainder of the copolymer being acrylonitrile units, but the most useful copolymers contain from 5 to 35% by weight of allyl chloride or of 2-methallyl units and from 95 to 65% by weight of acrylonitrile units. The copolymers are prepared from starting polymerization mixtures containing from 2 to 40% by weight of allyl chloride or of 2-methallyl chloride, the remainder of the monomeric polymerizable compound being in each case acrylonitrile.

The following examples will serve to illustrate further my new copolymers and the manner of preparing the same.

*Example 1*

15 g. of acrylonitrile, 5 g. of 2-methallyl chloride, 0.5 g. of sulfonated mineral oil, 0.5 g. of fatty alcohol sulfate (e. g. sodium lauryl sulfate), 0.03 g. of potassium persulfate and 100 cc. of water were mixed together in a cylindrical container which was four-fifths filled with the mixture. The container was then tumbled end over end, at from 10 to 20 R. P. M., at 50–60° C. for 48 hours. At the end of this time the copolymer had formed in a stable emulsion which was coagulated by adding sodium sulfate thereto. The copolymer which precipitated out was filtered off, washed with water and dried. A yield of 18 g. of fine, white powdery copolymer was obtained. The copolymer contained 80% by weight of acrylonitrile and 20% by weight of 2-methallyl chloride combined in the copolymer. The copolymer was soluble in a mixture consisting of 67% by weight of acetonitrile and 33% by weight of dimethyl formamide. Fibers or films made from the copolymer showed a softening point above 180° C.

*Example 2*

16 g. of acrylonitrile, 8 g. of methallyl chloride, 0.5 g. of sulfonated mineral oil, 0.5 g. of fatty alcohol sulfate (e. g., sodium lauryl sulfate), 0.03 g. of potassium persulfate and 100 cc. of water were mixed together in a bottle which was four-fifths filled with the mixture and placed in a bath at 50 to 60° C. and tumbled at 10 to 20 R. P. M. for a period of 48 hours. The copolymer had formed a stable emulsion at the end of this time. It was coagulated by adding sodium sulfate to the emulsion. The precipitated copolymer was then filtered off, washed with water and dried. The fine, white powdery copolymer obtained was soluble in acetonitrile, contained 65% by weight of acrylonitrile and 35% by weight of 2-methallyl chloride and fibers and films made therefrom showed a softening point above 160° C.

*Example 3*

90 g. of acrylonitrile, 10 g. of 2-methallyl chloride, 4 g. of fatty alcohol sulfate (e. g., sodium lauryl sulfate), 1.5 g. of sodium persulfate and 800 cc. of water were mixed together and stirred at 55–60° C. for 12 hours. An emulsion was obtained which was coagulated by adding sodium sulfate thereto. The copolymer which precipitated out was filtered off, washed with water and dried. A yield of 90 g. of fine, white powdery copolymer was obtained. The copolymer contained 91% by weight of acrylonitrile and 9% by weight of 2-methallyl chloride combined in the copolymer. The copolymer was soluble in a mixture consisting of 2 parts by weight of acetonitrile and 1 part by weight of dimethyl formamide. Fibers and films made from the copolymer showed a softening point above 220° C.

*Example 4*

70 g. acrylonitrile, 30 g. of 2-methallyl chloride and 2 g. of benzoyl peroxide were mixed together and placed in a glass tube of 15 mm. inside diameter. The tube was sealed and placed in a water bath at 60° C. for a period of 40 hours. The tube was then cooled in Dry Ice and the glass broken away from the resin which had formed to a hard, tough rod. The copolymer contained approximately 70% by weight of acrylonitrile and 30% by weight of 2-methallyl chloride combined in the copolymer. The copolymer was soluble in a mixture consisting of 2 parts by weight of acetonitrile and 1 part by weight of dimethyl formamide. The copolymer showed a softening point above 170° C.

*Example 5*

20 g. of acrylonitrile, 10 g. of allyl chloride, 0.5 g. of sulfonated mineral oil, 0.5 g. of fatty alcohol sulfate (e. g. sodium lauryl sulfate), 0.03 g. of potassium persulfate and 100 cc. of water were mixed together to form an emulsion and agitated at 50° C. for a period of 48 hours. The emulsion was then coagulated by the addition of sodium sulfate thereto. The copolymer which precipitated out was filtered off, washed with water and dried. A yield of 17 grams of fine, white powdery copolymer was obtained. The copolymer contained 80% by weight of acrylonitrile and 20% by weight of allyl chloride, combined in the copolymer. The copolymer was soluble in a mixture consisting of 2 parts by weight of acetonitrile and 1 part by weight of dimethyl formamide. Fibers and films made from the copolymer showed a softening point above 180° C.

*Example 6*

90 g. of acrylonitrile, 10 g. of allyl chloride, 4 g. of fatty alcohol sulfate (e. g. sodium lauryl sulfate), 1.5 g. of sodium persulfate and 800 cc. of water were mixed together and stirred at 55–60° C. for a period of 12 hours. The emulsion obtained was coagulated by adding sodium sulfate thereto. The copolymer which precipitated out was filtered off, washed with water and dried. 90 g. of fine, white powdery copolymer was obtained. The copolymer contained 91% by weight of acrylonitrile and 9% by weight of allyl chloride combined in the copolymer. The copolymer was soluble in a mixture consisting of 2 parts by weight of acetonitrile and 1 part by weight of dimethyl formamide. The copolymer had a softening point above 230° C.

Example 7

70 g. of acrylonitrile, 30 g. of allyl chloride and 2 g. of benzoyl peroxide were mixed together and placed in a glass tube of 15 mm. inside diameter. The tube was sealed and placed in a water bath at 60° C. for a period of 40 hours. The tube was then cooled in Dry Ice and the glass broken away from the solid, tough and hard rod of resin which had formed. The copolymer contained approximately 70% by weight of acrylonitrile and 30% by weight of allyl chloride combined in the copolymer. The copolymer was soluble in a mixture consisting of 2 parts by weight of acetonitrile and 1 part by weight of dimethyl formamide. The copolymer showed a softening point above 170° C.

Proceeding as shown in the foregoing examples, other copolymers can be prepared, for example, from monomeric mixtures containing 2% by weight of allyl chloride or of 2-methallyl chloride, 5% by weight of allyl chloride or of 2-methylallyl chloride, 15% by weight of allyl chloride or of 2-methallyl chloride, 20% by weight of allyl chloride or of 2-methallyl chloride, 35% by weight of allyl chloride or of 2-methallyl chloride and 40% by weight of allyl chloride or of 2-methallyl chloride, the remainder being acrylonitrile in each case.

The copolymers containing from 5 to 35% by weight of allyl chloride or of 2-methallyl chloride are soluble in acetonitrile, dimethyl formamide or in mixtures of these solvents, advantageously in a mixture of 2 parts by weight of acetonitrile and 1 part by weight of dimethyl formamide. From viscous dopes in these solvents, the copolymers can be extruded through a spinneret into a cabinet or cell where the solvent is evaporated to give monofilaments which can be spun to yarn. Such viscous dopes can also be coated on a film-forming surface of metal or glass, the solvent evaporated off and the resulting film stripped from the film-forming surface. The copolymers can also be molded with or without plasticizers, fillers, coloring matter, etc., by means of extrusion, injection or compression methods into shaped objects which can be worked into finished form by heat and mechanical means.

What I claim is:

1. A binary copolymer of from 65 to 95 per cent by weight of acrylonitrile and from 35 to 5 per cent by weight of 2-methallyl chloride.

2. A binary copolymer of from 65 to 95 per cent by weight of acrylonitrile and from 35 to 5 per cent by weight of allyl chloride.

3. A copolymer of 91% by weight of acrylonitrile and 9% by weight of 2-methallyl chloride.

4. A copolymer of 65% by weight of acrylonitrile and 35% by weight of 2-methallyl chloride.

5. A copolymer of 80% by weight of acrylonitrile and 20% by weight of allyl chloride.

6. A process for preparing a binary copolymer consisting of from 65 to 95 per cent by weight of acrylonitrile and from 35 to 5 percent by weight of 2-methallyl chloride comprising heating, in the presence of a polymerization catalyst, a mixture containing from 65 to 95 parts by weight of acrylonitrile and from 35 to 5 parts by weight of 2-methallyl chloride.

7. A process for preparing a binary copolymer consisting of from 65 to 95 per cent by weight of acrylonitrile and from 35 to 5 per cent by weight of allyl chloride comprising heating, in the presence of a polymerization catalyst, a mixture containing from 65 to 95 parts by weight of acrylonitrile and from 35 to 5 parts by weight of allyl chloride.

8. A process for preparing a copolymer consisting of 91 per cent by weight of acrylonitrile and 9 per cent by weight of 2-methallyl chloride comprising heating, in the presence of sodium persulfate, a mixture containing 90 parts by weight of acrylonitrile and 10 parts by weight of 2-methallyl chloride.

9. A process for preparing a copolymer consisting of 65 per cent by weight of acrylonitrile and 35 per cent by weight of 2-methallyl chloride comprising heating, in the presence of potassium persulfate, a mixture containing 67 parts by weight of acrylonitrile and 33 parts by weight of 2-methallyl chloride.

10. A process for preparing a copolymer consisting of 80 per cent by weight of acrylonitrile and 20 per cent by weight of allyl chloride comprising heating, in the presence of potassium persulfate, a mixture containing 67 parts by weight of acrylonitrile and 33 parts by weight of allyl chloride.

11. A binary copolymer of from 65 to 95 per cent by weight of acrylonitrile and from 35 to 5 per cent by weight of a compound selected from the group consisting of allyl chloride and 2-methallyl chloride.

12. A process for preparing a binary copolymer consisting of from 65 to 95 per cent by weight of acrylonitrile and from 35 to 5 per cent by weight of a compound selected from the group consisting of allyl chloride and 2-methallyl chloride comprising heating, in the presence of a polymerization catalyst, a mixture containing from 65 to 95 parts by weight of acrylonitrile and from 35 to 5 parts by weight of a compound selected from the group consisting of allyl chloride and 2-methallyl chloride.

JOHN R. CALDWELL.

References Cited in the file of this patent

UNITED STATES PATENTS

| Number | Name | Date |
|---|---|---|
| 2,123,599 | Fikentscher et al. | July 12, 1938 |
| 2,437,421 | D'Alelio | Mar. 9, 1948 |
| 2,525,521 | Caldwell | Oct. 10, 1950 |